United States Patent Office 3,573,266
Patented Mar. 30, 1971

3,573,266
POLYMERIZATION AND COPOLYMERIZATION OF OLEFINS AND RESULTING PRODUCTS
Jacques Stevens, Braine-l'Alleud, Belgium, assignor to Solvay et Cie, Societe Anonyme, Brussels, Belgium
No Drawing. Filed July 10, 1967, Ser. No. 651,973
Claims priority, application France, July 19, 1966, 69,897
Int. Cl. C08f 1/56, 3/06
U.S. Cl. 260—88.2
6 Claims

ABSTRACT OF THE DISCLOSURE

Olefins are polymerized and copolymerized by being contacted with a catalyst of the following components: (a) a Group IV, V or VI metal or a hydride or an organometallic compound thereof; (b) an alkoxy halide of titanium, zirconium or vanadium and (c) a halide of a Group III or V element. There can thus be obtained polyolefins which are more linear and crystalline than those of the prior art.

BACKGROUND OF THE INVENTION

The present invention is directed to a process for the polymerization and the copolymerization of olefins and in particular ethylene, in the presence of improved catalysts and to the improved polymers and copolymers thereby obtained.

In French Pat. No. 1,174,783 of May 3, 1957, it has been proposed to polymerize and to copolymerize olefins in the presence of a ternary catalyst comprising:

(a) A metal of the IVth, Vth or VIth group of the Periodic Table of the elements or a hydride or an organometallic compound of that metal;

(b) A mineral compound of a polyvalent metal having at least three valences;

(c) A halide of an element of the IIIrd or the Vth group of the Periodic Table.

Such a catalytic system is formed, for example, by the reaction of an alkyl derivative of lead or tin with titanium tetrachloride, and the addition of an anhydrous aluminum chloride or boron fluoride.

In these catalytic systems, the mineral compound of the polyvalent metal is usually an inorganic derivative of titanium, zirconium or vanadium.

SUMMARY OF THE INVENTION

It has now been found that by modifying the nature of this last-named element of the catalyst, polymerization products having different properties may be obtained. Thus it is possible to improve the properties of the polyolefins.

This result may be attained by replacing the mineral compound of a polyvalent metal having at least three valences with certain particular organic compounds of the same metals.

The invention comprises carrying out the polymerization and the copolymerization of olefins in the presence of a ternary catalyst comprising:

(a) A metal of the IVth, Vth or VIth group of the Periodic Table or a hydride or an organometallic compound of that metal;

(b) A compound of the formula $$M(OR)_n X_m$$

wherein M is titanium, zirconium or vanadium, R is a hydrocarbon radical, X is a halogen, and $n$ and $m$ are each an integer greater than 0, the sum of $n+m$ being equal to the valence of M; and (c) A halide of an element of the IIIrd or the Vth group of the Periodic Table.

The invention further comprises the improved polyolefins produced by the process of the invention.

DESCRIPTION OF THE PREFERRED EMBODIMENTS

The component $a$ of the catalyst is preferably an alkyl derivative of tin, lead or silicon. Tetrabutyl tin is particularly preferred.

The component $c$ is advantageously a halide of aluminum, particularly the chloride.

The component $b$ is preferably an alkoxy halide of titanium, zirconium or vanadium.

The dialkoxy titanium dichlorides of the formula $$Cl_2Ti(OR)_2$$

in which R is an alkyl group containing 1 to 20 carbon atoms are particularly preferred compounds for the production according to the invention of catalysts having advantageous properties. Also preferred are the trialkoxy titanium monochlorides and the monoalkoxy titanium trichlorides. Furthermore similar results may be obtained with compounds in which the chlorine atom is replaced with bromine or another halogen, and the alkyl groups are replaced with aryl, alkylaryl, arylalkyl or cycloalkyl groups.

The haloalkoxy titanium compounds may easily be obtained either by the reaction between a tetrahalide and a tetraalkoxide of titanium or by the reaction of a hydroxy derivative and a titanium tetrahalide. In the last case, the alkoxy halides may be obtained as complexes with the hydroxy derivatives, i.e., a portion of the hydroxy derivative may complex to produce a complex of the alkoxy halide rather than react with the titanium tetrahalide to form alkoxy halide. The hydroxy derivative is preferably an alcohol.

The molecular ratio of the reactants is directly responsible for the structure of the alkoxy halide which is formed. For example:

$$TiCl_4 + Ti(OR)_4 \rightarrow 2TiCl_2(OR)_2$$

In the case wherein a hydroxy derivative is used, it should be remembered for determining the proportion of the reactant, that a portion of the hydroxy derivative could be used up in the formation of the aforementioned complexes.

The preparation of the alkoxy titanium halide may be carried out before preparing the polymerization catalyst. The alkoxy titanium halide can be prepared in situ in the container where it is intended to prepare the catalyst and also simultaneously with the preparation of the catalyst.

In this last case, four reactants instead of three are used for the preparation of the catalyst:

($a$) A metal of the IVth, Vth or VIth group of the Periodic Table or a hydride or an organometallic compound of that metal, ($b_1$) A titanium, zirconium or vanadium halide, ($b_2$) An alkoxy compound of the same metal or a hydroxy derivative ROH, in which R is as hereinabove defined, ($c$) A halide of an element of the IIIrd or the Vth group of the Periodic Table.

The order in which the reactants used for the preparation of the catalyst are introduced is not an essential characteristic of the invention, though it is preferred to operate as follows in the case when an alkoxide and a halide are used to form the alkoxy halide:

The M alkoxide is added to the M halide and the reaction of the two compounds is carried out at a determined temperature, for example from 25 to 60° C., for a period sufficient to have a complete reaction, generally from 30 minutes to 2 hours;

Separately, the component a and the component c, for example tetrabutyl tin and aluminum chloride, are reacted;

The reaction product of this second reaction is added to the M alkoxy halide formed during the first reaction and the temperature is maintained at from 20 to 100° C. for 15 minutes to 2 hours to form the polymerization catalyst.

In the case wherein an alcohol is used instead of an alkoxide for the preparation of the alkoxy halide, the reaction may be carried out under similar conditions, but the contact period is generally shorter since the reaction is more violent.

The catalyst may also be prepared by reacting the alkoxide with a reaction product of the components a and c, and by gradually adding the M halide.

As another alternative, the components a and b or a, $b_1$ and $b_2$ may first be reacted and then the component c may be added thereto.

Whatever order of reaction is selected, it is preferable, in any case, to carry out these reactions in the absence of solvent. When the reactants are diluted, the reaction period is extended without any advantage.

By using the catalysts according to the invention, it is possible to produce polyolefins which are more linear and more crystalline than those obtained with the catalysts of the prior art and in particular with the catalysts described in French Patent No. 1,174,783. The new catalysts are particularly suitable for the polymerization of ethylene and its copolymerization with other α-olefins, in particular propylene and butene-1.

In the case of polyethylene, it has been found that the products obtained by using the new catalysts have a true specific weight which is much higher than that obtained by use of the prior art catalysts.

The catalysts described in the above identified French patent, for example the catalysts prepared from $TiCl_4$, $AlCl_3$ and $Sn(C_4H_9)_4$, generally produce polyethylenes having true specific weights from 0.948 to 0.955 g./cm.$^3$. On the other hand, the new catalysts will produce polyethylenes having higher specific weights, generally varying from 0.957 to 0.967 g./cm.$^3$ and in some cases even higher. This increase in the true specific weight, in practical terms, corresponds to an increase in the rigidity of the product and in particular of the molded products produced therefrom. Such a rigidity is highly desirable for large molded articles, for example bottles and other containers.

The increase in the true specific weight of the polyethylenes prepared by using the catalysts according to the present invention is believed to be due to a higher linearity of the polymer chains. It has been found that the polyethylenes obtained according to the process of the invention have chains containing less than one $CH_3$ group, from 1 to 1.5 vinyl double bonds, from 0.07 to 0.15 vinylidene group and from 0.05 to 0.1 trans-internal double bond per 1000 carbon atoms.

The ratio of the quantities of the components a, b and c of the catalyst has a direct effect on the properties of the resulting polyolefins. It has been found that, in most cases, when all the components of the catalyst are identical, the specific weight of the polymer increases when the molar ratio a/b of the catalyst decreases.

It has also been found that the ratio of the quantities of the components a, b and c which are used for the preparation of the catalyst has an important influence on its activity. Generally, it is preferred that the molar ratio a/c be from 0.75 to 1.5.

Another way to modify the properties of the resulting polymers consists in introducing hydrogen into the pomerization reaction vessel. The hydrogen acts as a chain transfer agent, decreases the molecular weight and therefore increases the fusion index of the polyolefins, which is often highly desirable. Hydrogen effects no marked reduction in the catalytic activity of the catalysts of the invention.

The following examples are intended to illustrate the present invention and are not given for the purpose of limiting the scope thereof.

Examples 1 to 6

A series of polymerization catalysts are prepared by mixing together, in the absence of solvent, under an inert atmosphere and in the conditions specified in Table I below, various titanium alkoxy halides with a certain quantity of the reaction product of 14.9 g. tetrabutyl tin and 5.74 g. of aluminum chloride. Table I indicates the quantities of tetrabutyl tin and aluminum chloride used to make that portion of the reaction product employed in each of the examples.

The reaction between the tetrabutyl tin and aluminum chloride is carried out by maintaining the two reactants in contact with one another in the absence of solvent at a temperature of 50° C. for 48 hours. The end of the reaction is indicated by a complete dissolution of the aluminum chloride.

The catalysts are introduced into a 1.5 liter autoclave which is kept dry and is flushed with nitrogen, and contains 700 ml. of hexane which has been dried on activated alumina. The mixture is heated to 75° C. and ethylene is introduced therein in such a manner as to maintain a constant pressure of 15 kg./cm.$^2$.

After 1 hour gaseous ethylene is removed, the resulting polyethylene is separated, dried and weighed, and the fusion index and the true specific weight are determined.

The examples $R_1$ and $R_2$, given by way of reference, are directed to catalysts comprising a mixture of $TiCl_4$ and $Ti(OC_2H_5)_4$, which are different from those according to the invention.

TABLE I

| | Preparation of the catalyst | | | | | | | Polyethylene product | | | |
|---|---|---|---|---|---|---|---|---|---|---|---|
| | $TiCl_n(OR)_{4-n}$ | | $Sn(C_4H_9)_4$ Weight, grams | $AlCl_3$ Weight, grams | Sn/Ti molar ratio | Length of the reaction in min. | Reaction temperature, ° C. | Weight, grams | Activity, of catalyst [1] | Fusion index, g./10 min. | True specific weight, g./cm.$^3$ |
| Example No. | Identity | Weight, grams | | | | | | | | | |
| $R_1$ | $TiCl_4$ | 0.156 | 0.745 | 0.287 | 2.6 | 32 | −5 | [2] 49.5 | 13.3 | 0.3 | 0.9487 |
| $R_2$ | $Ti(OC_2H_5)_4$ | 0.755 | 1.845 | 0.710 | 1.6 | 170 | 80 | 0 | 0 | | |
| 1 | $TiCl_2(OC_2H_5)_2$ | 0.607 | 1.845 | 0.710 | 1.8 | 63 | 70 | 133 | 4.9 | 18 | 0.963 |
| 2 | $TiCl_2(OC_2H_5)_2$ | 0.651 | 1.845 | 0.710 | 1.7 | 60 | 80 | 94.5 | 3.5 | 0.58 | 0.959 |
| 3 | $TiCl_2(OC_2H_5)_2 \cdot C_2H_5OH$ | 0.696 | 1.845 | 0.710 | 1.6 | 90 | 80 | 17 | 0.62 | 0.02 | 0.954 |
| 4 | $TiCl_3(OC_2H_5)$ | 0.647 | 1.845 | 0.710 | 1.6 | 12 | 70 | 187 | 6.7 | 4.8 | 0.955 |
| 5 | $TiCl_3(OC_2H_5) \cdot C_2H_5OH$ | 0.700 | 1.845 | 0.710 | 1.9 | 125 | 40 | 95 | 3.5 | 2.7 | 0.958 |
| 6 | $TiCl_3(OC_2H_5) \cdot C_2H_5OH$ | 0.695 | 1.845 | 0.710 | 1.9 | 25 | 80 | 176 | 6.4 | 5.3 | 0.956 |

[1] Grams polyethylene/hr.·atmospheres $C_2H_4$·g. $Sn(C_4H_9)_4$.
[2] Pressure of ethylene 5 kg./cm.$^2$ The results set forth in Table I clearly show the increase of the true specific weight of polyethylene obtained by using the catalyst according to the invention. Use of the catalysts prepared from titanium tetrachloride results in products having specific weight notably lower while the catalysts prepared from titanium tetraethylate are not active under the above conditions.

Examples 7 to 17

Polymerization catalysts are prepared and tests for the polymerization of ethylene are carried out exactly under the conditions given in Examples 1 to 6, with the exception that the alkoxy titanium halide is prepared from titanium tetrachloride and tetraalkoxy titanium in the vessel in which the catalyst is prepared.

The conditions of the reaction between $TiCl_4$ and $Ti(OR)_4$, and those for the preparation of the catalyst are given in Table II, and the properties of the resulting polyethylene are given in Table III.

The reaction conditions between titanium tetrachloride and the various alcohols and those used for the preparation of the catalyst are given in Table IV, and the results concerning the polyethylene product are given in Table V.

TABLE II

| | Preparation of the alkoxyhalide | | | | | Preparation of catalyst | | | | |
|---|---|---|---|---|---|---|---|---|---|---|
| Example No. | Weight of TiCl$_4$, grams | Ti(OR)$_4$ Identity of R | Weight grams | Length of reaction, min. | Temperature of reaction, min. | Sn(C$_4$H$_9$)$_4$, grams | AlCl$_3$, grams | Molar ratio, Sn/Ti | Length of the reaction, min. | Temperature of reaction, °C. |
| 7 | 0.26 | n-C$_4$H$_9$ | 0.43 | 15 | 25 | 1.845 | 0.710 | 2.2 | 30 | 60 |
| 8 | 0.26 | n-C$_4$H$_9$ | 0.43 | 15 | 25 | 1.845 | 0.710 | 2.2 | 15 | 25 |
| 9 | 0.26 | n-C$_4$H$_9$ | 0.43 | 30 | 60 | 1.845 | 0.710 | 2.2 | 30 | 60 |
| 10 | 0.24 | n-C$_4$H$_9$ | 0.54 | 30 | 60 | 1.845 | 0.710 | 1.9 | 30 | 60 |
| 11 | 0.26 | i-C$_3$H$_7$ | 0.38 | 30 | 60 | 1.845 | 0.710 | 2.0 | 30 | 60 |
| 12 | 0.26 | i-C$_3$H$_7$ | 0.38 | 30 | 60 | 1.845 | 0.710 | 2.0 | 30 | 60 |
| 13 | 0.31 | C$_2$H$_5$ | 0.30 | 30 | 60 | 1.845 | 0.710 | 1.8 | 20 | 80 |
| 14 | 0.24 | C$_2$H$_5$ | 0.38 | 30 | 60 | 1.845 | 0.710 | 1.8 | 145 | 60 |
| 15 | 0.22 | C$_2$H$_5$ | 0.34 | 30 | 60 | 1.845 | 0.710 | 2.0 | 100 | 60 |
| 16 | 0.31 | n-C$_8$H$_{17}$ | 1.0 | 30 | 60 | 1.845 | 0.710 | 1.6 | 107 | 70 |
| 17 | 0.26 | C$_4$H$_9$—CH(C$_2$H$_5$)—CH$_2$— | 0.89 | 30 | 60 | 1.845 | 0.710 | 1.9 | 45 | 70 |

TABLE III

| | Polyethylene product | | | | |
|---|---|---|---|---|---|
| Example No. | Weight, grams | Activity of catalyst [1] | Fusion index, g./10 min. | True specific weight, g./cm.$^3$ | Rigidity against flexure |
| 7 | 154 | 3.1 | 0.07 | 0.956 | 9,250 |
| 8 | 132 | 3.35 | 2 | 0.959 | 10,000 |
| 9 | 136 | 3.45 | [2] 34 | 0.970 | 12,000 |
| 10 | 156 | 6.4 | 0.8 | 0.960 | 10,000 |
| 11 | 165 | 5.9 | 1 | 0.957 | 9,500 |
| 12 | 142 | 5.0 | [2] 45 | 0.965 | 11,200 |
| 13 | 140.5 | 5.2 | 12 | 0.962 | |
| 14 | 125.5 | 4.6 | 0.66 | 0.957 | |
| 15 | 86 | 3.1 | [3] 4.9 | 0.961 | |
| 16 | 198 | 7.1 | [4] 11 | 0.962 | |
| 17 | 150 | 5.2 | [4] 8.4 | 0.965 | |

[1] Grams polyethylene/hr.·atmospheres C$_2$H$_4$·g. Sn(C$_4$H$_9$)$_4$.
[2] Partial pressure of hydrogen: 10 kg./cm.$^2$
[3] Partial pressure of hydrogen: 2 kg./cm.$^2$
[4] Partial pressure of hydrogen: 1.5 kg./cm.$^2$ It is observed that in all cases, when using the catalysts according to the invention, it is possible to obtain polyethylene having a true specific weight higher than 0.955 and that in some cases, it is possible to attain specific weights at least as high as 0.970 g./cm.$^3$.

To illustrate the increase of the rigidity of the resulting products when using the new catalysts, in Table III there are given results obtained according to the ASTM D 747–58T test which should be compared to the value of 7600 kg./cm.$^2$ which characterizes a polyethylene obtained according to French Pat. No. 1,174,783.

Examples 18 to 25

Under the same conditions as those given in Examples 1 to 6 and 7 to 17, polymerization catalysts are prepared from titanium tetrachloride, various alcohols, tetrabutyl tin and aluminum chloride and tests are carried out for the polymerization of ethylene.

TABLE V

| | Polyethylene product | | | |
|---|---|---|---|---|
| Example No. | Weight, grams | Activity of catalyst [1] | Fusion index, g./10 min. | True specific weight, g./cm.$^3$ |
| 18 | 197 | 7.2 | [2] 26 | 0.956 |
| 19 | 107 | 3.8 | [2] 9.5 | 0.957 |
| 20 | 110 | 4.0 | [2] 12 | 0.962 |
| 21 | 116 | 4.1 | 1.6 | 0.958 |
| 22 | 58 | 2.1 | 2.9 | 0.959 |
| 23 | 106 | 3.71 | 0.75 | 0.956 |
| 24 | 36 | 1.2 | 1.1 | 0.959 |
| 25 | 140 | 5.1 | 6 | 0.962 |

[1] Grams polyethylene/hr.·atmospheres C$_2$H$_4$·g. Sn(C$_4$H$_9$)$_4$.
[2] Partial pressure of hydrogen:1.5 kg./cm.$^2$ As above, it is found that the catalysts according to the invention will produce polyethylene products having very high specific weights.

Furthermore, Examples 18 to 20 show clearly the increase of the true specific weight of the polyethylene in relation to the decrease of the molar ratio Sn/Ti.

Example 26

A reaction is carried out for a period of 30 minutes at a temperature of 60° C. between 234 mg. of titanium tetrachloride and 344 mg. of Ti(OC$_2$H$_5$)$_4$ in the absence of solvent and under an inert atmosphere. The product so obtained is mixed with 2.57 g. of the reaction product of Sn(C$_4$H$_9$)$_4$ and aluminum trichloride prepared as indicated in Example 1, corresponding to 1.845 g. of Sn(C$_4$H$_9$)$_4$.

The resulting catalyst is introduced into a dry 1.5 liter autoclave flushed with nitrogen and containing 700 ml. of dry hexane. The mixture is heated to 70° C. and simultaneously ethylene is introduced at a constant flow of 90 g./hr. and propylene at a constant flow of 10 g./hr.

TABLE IV

| | Preparation of the alkoxyhalide | | | | | | Preparation of the catalyst | | | | |
|---|---|---|---|---|---|---|---|---|---|---|---|
| Example No. | Weight of TiCl$_4$, grams | ROH Identity of R | Weight grams | Length of reaction, min. | Reaction temperature, °C. | Formula of resulting product | Sn(C$_4$H$_9$)$_4$, grams | AlCl$_3$, grams | Molar ratio Sn/Ti | Length of the reaction, min. | Reaction temperature, °C. |
| 18 | 0.39 | C$_2$H$_5$ | 0.20 | 15 | 40 | TiCl$_2$(OC$_2$H$_5$)$_2$.C$_2$H$_5$OH | 1.845 | 0.710 | 2.5 | 50 | 60 |
| 19 | 0.50 | C$_2$H$_5$ | 0.245 | 15 | 40 | TiCl$_2$(OC$_2$H$_5$)$_2$.C$_2$H$_5$OH | 1.845 | 0.710 | 2 | 70 | 60 |
| 20 | 0.54 | C$_2$H$_5$ | 0.27 | 15 | 40 | TiCl$_2$(OC$_2$H$_5$)$_2$.C$_2$H$_5$OH | 1.845 | 0.710 | 1.8 | 50 | 60 |
| 21 | 0.54 | C$_2$H$_5$ | 0.26 | 15 | 40 | TiCl$_2$(OC$_2$H$_5$)$_2$.C$_2$H$_5$OH | 1.845 | 0.710 | 1.9 | 29 | 80 |
| 22 | 0.665 | C$_2$H$_5$ | 0.26 | 60 | 40 | TiCl$_2$(OC$_2$H$_5$)$_2$.C$_2$H$_5$OH | 1.845 | 0.710 | 1.52 | 130 | 70 |
| 23 | 0.475 | iC$_4$H$_9$ | 0.465 | 15 | 40 | TiCl$_2$(OiC$_4$H$_9$)$_2$.C$_4$H$_9$OH | 1.845 | 0.710 | 2.2 | 60 | 60 |
| 24 | 0.56 | iC$_4$H$_9$ | 0.50 | 15 | 40 | TiCl$_2$(OiC$_4$H$_9$)$_2$.C$_4$H$_9$OH | 1.845 | 0.710 | 1.8 | 60 | 80 |
| 25 | 0.55 | C$_{11}$H$_{23}$ | 0.99 | 15 | 40 | | 1.845 | 0.710 | 1.8 | 80 | 60 |

After 1 hour, the monomer gases which have not reacted are removed and the product is separated, dried and weighed and is examined.

It is observed that 63.5 g. of a copolymer of ethylene and propylene are obtained having a true specific weight of 0.936 g./cm.$^3$, a fusion index of 0.97 and a propylene content, determined by infra-red spectrometry, of 36 g./kg. of the resulting product or 2.43 mole percent.

Although specific embodiments of this invention have just been described, it is understood that modifications are permissible within the spirit of the invention, the scope of which is to be determined from the appended claims only.

What I claim and desire to secure by Letters Patent is:

1. Process for the polymerization of ethylene and the copolymerization of ethylene with at least one olefin selected from the group consisting of propylene and 1-butene which comprises carrying out said polymerization and copolymerization in the presence of a catalyst consisting essentially of:
   (a) an alkyl tin,
   (b) a compound of the formula $Ti(OR)_nX_m$ wherein Ti is titanium, R is a hydrocarbon radical, X is a halogen and $n$ and $m$ are each an integer greater than 0, $n+m$ being equal to 4, and
   (c) an aluminum halide,
the molar ratio between said alkyl tin and said aluminum halide being comprised between 0.75 and 1.5.

2. Process according to claim 1, in which the aluminum halide is aluminum chloride.

3. Process according to claim 1 wherein the catalyst is prepared by reacting said alkyl tin and said aluminum halide in the absence of solvent, reacting titanium tetralkoxide with titanium tetrahalide in the absence of solvent at a temperature comprised between about 25 and 60° C. and mixing the products of both reactions at a temperature comprised between about 20 and 100° C.

4. Process according to claim 3 wherein said reaction of said alkoxide of titanium with said halide of titanium and mixing of said products of both reactions are carried on in the same vessel.

5. Process according to claim 1 wherein said compound of the formula $Ti(OR)_nX_m$ is a complex of the formula $Ti(OR)_nX_m \cdot ROH$ and is prepared by adding a hydroxy derivative of the formula ROH, in which R is as defined in claim 1, to a titanium tetrahalide in the absence of solvent at a temperature comprised between 25 and 60° C.

6. Process according to claim 5 wherein the catalyst is prepared in same vessel as said complex of formula $Ti(OR)_nX_m \cdot ROH$ by further adding the product of the reaction of said alkyl tin with said aluminum halide at a temperature comprised between 20 and 100° C.

References Cited

UNITED STATES PATENTS

| | | | |
|---|---|---|---|
| 3,066,132 | 11/1962 | Edmonds | 260—94.9 |
| 3,072,631 | 1/1963 | Joyner | 260—94.9 |
| 3,073,811 | 1/1963 | Natta et al. | 260—93.7 |
| 3,202,617 | 8/1965 | Enk et al. | 252—429 |
| 3,210,334 | 10/1965 | Carrick | 260—94.9 |
| 3,328,378 | 6/1967 | Pierkarski et al | 260—94.9 |
| 3,424,737 | 1/1969 | Delbouille et al. | 260—94.9 |
| 3,006,910 | 10/1961 | Pritchett et al. | 260—94.9 |
| 3,116,274 | 12/1963 | Boehm et al. | 260—94.9 |

FOREIGN PATENTS

| | | | |
|---|---|---|---|
| 860,407 | 2/1961 | Great Britain | 260—94.9E |
| 944,371 | 12/1963 | Great Britain | 260—94.9B |
| 1,022,039 | 3/1966 | Great Britain | 260—94.9B |

JOSEPH L. SCHOFER, Primary Examiner

E. J. SMITH, Assistant Examiner

U.S. Cl. X.R.

252—429; 260—94.9